United States Patent
Asp et al.

(10) Patent No.: US 11,070,081 B2
(45) Date of Patent: Jul. 20, 2021

(54) BUILDING MANAGEMENT SYSTEM WITH SMART CIRCUIT BREAKER

(71) Applicant: Johnson Controls Technology Company, Auburn Hills, MI (US)

(72) Inventors: Gerald A. Asp, Milwaukee, WI (US); Justin J. Ploegert, Cudahy, WI (US); Paul K. Schemenauer, Milwaukee, WI (US); Robert A. Fox, Burlington, WI (US); Daniel A. Mellenthin, West Allis, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 49 days.

(21) Appl. No.: 16/215,791

(22) Filed: Dec. 11, 2018

(65) Prior Publication Data

US 2019/0179276 A1 Jun. 13, 2019

Related U.S. Application Data

(60) Provisional application No. 62/597,807, filed on Dec. 12, 2017.

(51) Int. Cl.
*H02J 13/00* (2006.01)
*G05B 19/042* (2006.01)
(Continued)

(52) U.S. Cl.
CPC ...... *H02J 13/00007* (2020.01); *G05B 19/042* (2013.01); *H02J 13/0017* (2013.01);
(Continued)

(58) Field of Classification Search
CPC ........ G05B 19/042; G05B 2219/25011; G06Q 50/06; G01R 11/24; G01R 19/2513;
(Continued)

(56) References Cited

U.S. PATENT DOCUMENTS 6,141,197 A 10/2000 Kim et al.
6,690,594 B2 * 2/2004 Amarillas ........... H02J 13/0006
363/124

(Continued)

OTHER PUBLICATIONS

Continental Control Systems, WattNode BACnet Power and Energy Meters, http://web.archive.org/web/20170227152339/https://ctlsys.com/wattnode_bacnet_power_energy_meters/, retrieved on Dec. 10, 2018, 2 pages.

(Continued)

*Primary Examiner* — Crystal J Barnes-Bullock
(74) *Attorney, Agent, or Firm* — Foley & Lardner LLP

(57) ABSTRACT

A smart circuit breaker is configured for installation within a panel assembly. The smart circuit breaker includes a breaker device positioned between a power source and a subcircuit, the breaker device having a moveable contactor configured to change from an open state to a closed state, wherein in the closed state power flows from the power source to the subcircuit via a power line, and wherein in the open state power does not flow from the power source to the subcircuit. The smart circuit breaker further includes a power meter configured to measure a power characteristic of the subcircuit. The smart circuit breaker further includes a processing circuit configured to receive a power characteristic measurement from the power meter, the processing circuit having a communications interface configured to communicate power consumption data to an external device, the power consumption data based on the power characteristic.

19 Claims, 9 Drawing Sheets

(51) Int. Cl.
*H04Q 9/02* (2006.01)
*H04Q 9/00* (2006.01)

(52) U.S. Cl.
CPC ............... *H04Q 9/00* (2013.01); *H04Q 9/02* (2013.01); *G05B 2219/25011* (2013.01); *H04Q 2209/30* (2013.01); *H04Q 2209/60* (2013.01)

(58) Field of Classification Search
CPC . G01R 22/066; G01R 31/40; H02J 13/00007; H02J 13/0006; H02J 13/0017; H02J 13/0075; H04Q 9/00; H04Q 9/02; H04Q 2209/30; H04Q 2209/60; H01H 89/06; H01H 2089/065; H02H 3/42; Y02B 90/2615; Y02B 90/2653; Y02E 60/7815; Y02E 60/7853; Y04S 40/121; Y04S 40/126
See application file for complete search history.

(56) References Cited

U.S. PATENT DOCUMENTS

| | | | | |
|---|---|---|---|---|
| 6,836,099 | B1* | 12/2004 | Amarillas | H02M 5/293 363/124 |
| 6,988,375 | B2* | 1/2006 | Bashark | G01R 15/142 34/553 |
| 7,336,514 | B2* | 2/2008 | Amarillas | H02J 13/0006 363/124 |
| 8,310,370 | B1 | 11/2012 | Williams et al. | |
| 8,447,541 | B2* | 5/2013 | Rada | G05F 1/70 702/60 |
| 8,818,742 | B2* | 8/2014 | Ansari | G01R 22/066 702/61 |
| 9,014,996 | B2* | 4/2015 | Kamel | G08C 19/00 702/62 |
| 9,052,216 | B2* | 6/2015 | Kamel | H02J 3/00 |
| 9,432,214 | B2* | 8/2016 | Lal | H02B 1/04 |
| 9,438,026 | B2* | 9/2016 | Franks | H02H 3/32 |
| 9,595,825 | B2* | 3/2017 | Curt | H02H 3/42 |
| 10,067,199 | B2* | 9/2018 | Eldridge | H02S 50/10 |
| 10,804,965 | B2* | 10/2020 | Bennett | H04B 5/0031 |
| 2008/0167755 | A1 | 7/2008 | Curt | |
| 2012/0245869 | A1* | 9/2012 | Ansari | G01R 11/24 702/62 |
| 2014/0146431 | A1* | 5/2014 | Franks | H02H 3/32 361/93.2 |
| 2014/0340822 | A1* | 11/2014 | Lal | H02B 1/04 361/652 |
| 2016/0003492 | A1* | 1/2016 | Klein | G05D 23/1905 236/1 C |
| 2017/0140602 | A1* | 5/2017 | Curt | H02J 13/0075 |
| 2020/0212959 | A1* | 7/2020 | Eriksen | H01R 13/7135 |

OTHER PUBLICATIONS

Eaton, What Else Could We Teach a Circuit Breaker to Do?, http://www.eaton.com/FTC/utilities/EMCB/index.htm?wtredirect=www.eaton.com/EMCB, retrieved Dec. 10, 2018, 11 pages.

Greentech Media, Smart Circuit Breakers: The Next Frontier of the Grid Edge?, Apr. 19, 2017, 4 pages.

* cited by examiner

BUILDING MANAGEMENT SYSTEM WITH SMART CIRCUIT BREAKER

CROSS-REFERENCE TO RELATED PATENT APPLICATIONS

This application claims priority to and the benefit of U.S. Provisional Patent Application No. 62/597,807, entitled "Building Management System with Smart Circuit Breaker," filed Dec. 12, 2017, which is incorporated herein by reference in its entirety.

BACKGROUND

The present disclosure relates generally to a building management system (BMS) and more particularly to a BMS with a smart circuit breaker. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

A BMS may be configured with an energy management system to monitor energy usage within a building or a building space. One challenge with energy management is the lack of electric sub meters to measure energy consumption of subcircuits and individual loads of a building. If a building only has a single main electric utility meter for measuring energy consumption of a building, then an energy management system may only be able to determine total energy usage of the building. Accordingly, it may be unable to determine energy usage of specific rooms and/or floors, which can be useful to determine which floors are performing better than others. It is also difficult to compare the lighting, HVAC and plug loads to determine where the most energy is being consumed.

In current and existing systems, subsystem meters to monitor energy consumption of subcircuits is generally costly to install and maintain. For example, as the number of monitored subcircuits increases, installation costs and complexity can increase. Furthermore, single circuit or multi-circuit approaches can require current transformers to be installed around subcircuit wiring, but space within a panel is often unavailable or limited for additional components. When multiple current transformers are added to a panel, issues can arise involving separation of low voltage circuits.

SUMMARY

One implementation of the present disclosure is a smart circuit breaker configured for installation within a panel assembly. The smart circuit breaker includes a breaker device positioned between a power source and a subcircuit, the breaker device having a moveable contactor configured to change from an open state to a closed state, wherein in the closed state power flows from the power source to the subcircuit via a power line, and wherein in the open state power does not flow from the power source to the subcircuit. The smart circuit breaker further includes a power meter configured to measure a power characteristic of the subcircuit. The smart circuit breaker includes a processing circuit configured to receive a power characteristic measurement from the power meter, the processing circuit having a communications interface configured to communicate power consumption data to an external device, the power consumption data based on the power characteristic measurement.

Another implementation of the present disclosure is a building management system. The building management system includes a panel assembly and a communications device. The panel assembly is configured to receive power from a power source and supply power to a number of subcircuits. The panel assembly includes a plurality of smart circuit breakers corresponding to the number of subcircuits and a panel enclosure configured to house the plurality of smart circuit breakers. Each of the smart circuit breakers includes a breaker device having a moveable contactor configured to change from an open state to a closed state, wherein in the closed state power flows from the power source to one of the subcircuits, and wherein in the open state power does not flow from the power source to the subcircuit. Each of the smart circuit breakers further includes a power meter configured to measure a power characteristic of the subcircuit. Each of the smart circuit breakers further includes a processing circuit configured to receive a power characteristic measurement from the power meter, the processing circuit having a communications interface configured to communicate power consumption data, the power consumption data based on the power characteristic measurement.

Another implementation of the present disclosure is a panel assembly. The panel assembly is configured to receive power from a power source and supply power to a number of subcircuits in a building management system. The panel assembly includes a plurality of smart circuit breakers corresponding to the number of subcircuits and a panel enclosure configured to house the plurality of smart circuit breakers. Each of the smart circuit breakers includes a breaker device having a moveable contactor configured to change from an open state to a closed state, wherein in the closed state power flows from the power source to one of the subcircuits, and wherein in the open state power does not flow from the power source to the subcircuit. Each of the smart circuit breakers further includes a power meter configured to measure a power characteristic of the subcircuit. Each of the smart circuit breakers further includes a processing circuit configured to receive a power characteristic measurement from the power meter, the processing circuit having a communications interface configured to communicate power consumption data, the power consumption data based on the power characteristic measurement.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Referring generally to the FIGURES, a building management system (BMS) with smart circuit breakers is shown according to some embodiments. The BMS can include a panel assembly configured to receive a power supply from a main service (e.g. a utility). The panel assembly may be positioned between the main service and an electric load divided into a number of electric subcircuits. The panel assembly may include a number of smart circuit breakers, whereby each smart circuit breaker is electrically connected to one of the subcircuits.

Each smart circuit breaker in the panel assembly can be configured to perform a circuit breaker function. For example, the smart circuit breaker may include a relay with a set of contacts that open or close ("make or break") a power supply connection to its corresponding electric subcircuit in response to a switch position and/or an overload condition of the corresponding subcircuit. In addition, each smart circuit breaker can also be configured to perform an energy management function. An energy management function may include measuring a power characteristic (e.g., voltage or current) of its corresponding subcircuit. Each of the smart circuit breakers may be communicably coupled to a communication device or a controller. In this regard, the smart circuit breakers may send power characteristic measurements to the communication device or controller, and can receive a control instruction to close or open the relays.

In some embodiments, each smart circuit breaker is configured to communicate data over a power line. A communication device may be coupled to a power line of a subcircuit and configured to exchange data with each smart circuit breaker over the power line. This may facilitate convenient installation of a system configured for energy management of individual subcircuits because an installer may simply replace a traditional circuit breaker in a panel assembly with a smart circuit breaker. An information technology specialist can independently configure the communication device to exchange data (e.g., power characteristic information) with the smart circuit breakers.

Embodiments of the building management system (BMS) with smart circuit breaker may further improve current systems by, for example, reducing cost and space requirements. In some embodiments, systems described herein may be configured to combine control circuitry (e.g. lighting control switches) and energy management features into a smart circuit breaker and/or a panel assembly configured with smart circuit breakers. For example, one or more semiconductor devices or circuits, such as an energy meter circuit, can be configured within the smart circuit breaker, reducing the total number of components and costs.

Building HVAC Systems and Building Management Systems

Figure 1:
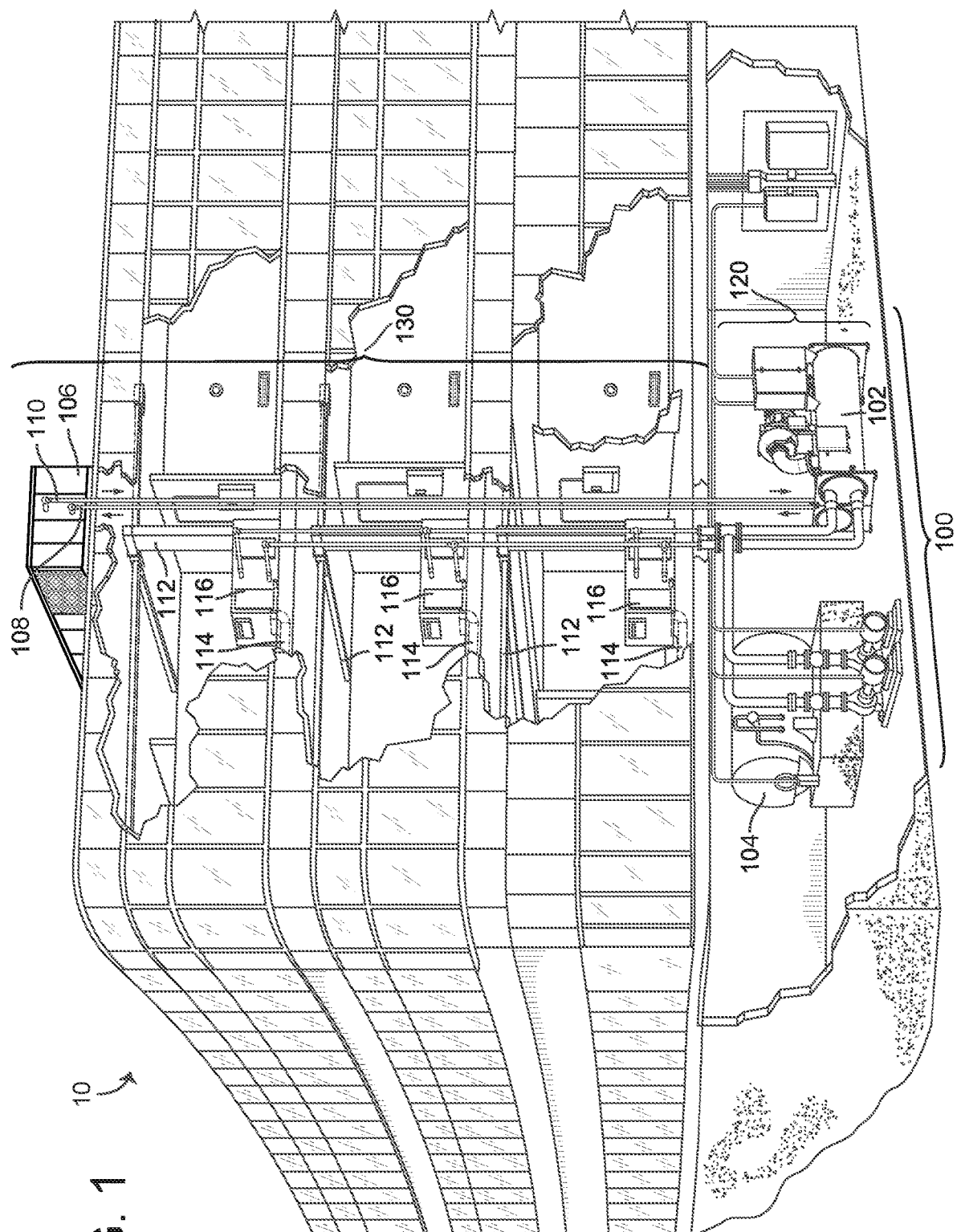
FIG. 1 is a drawing of a building equipped with a HVAC system, according to some embodiments.
Figure 2:
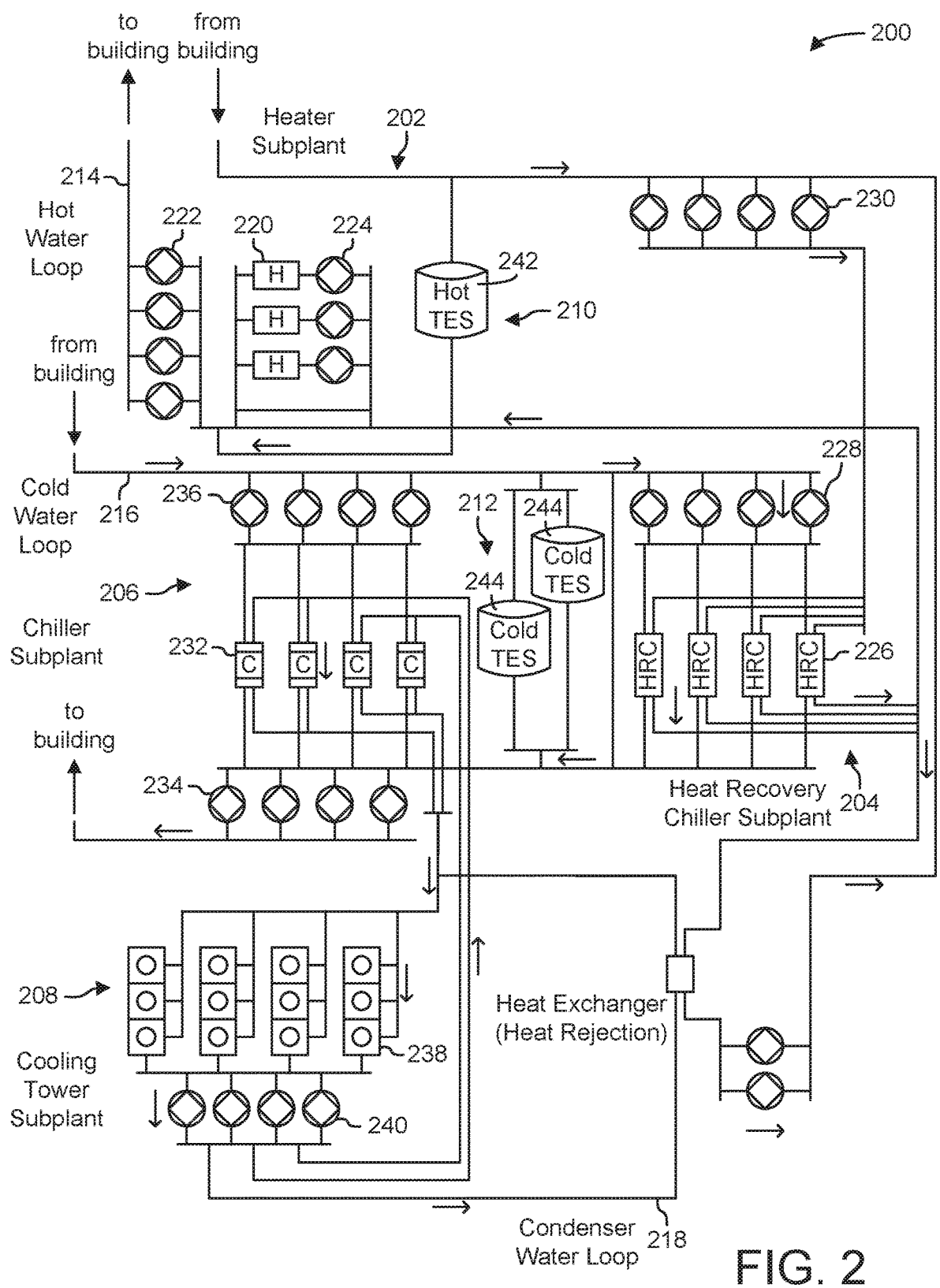
FIG. 2 is a block diagram of a waterside system which can be used to serve the building of FIG. 1, according to some embodiments.
Figure 3:
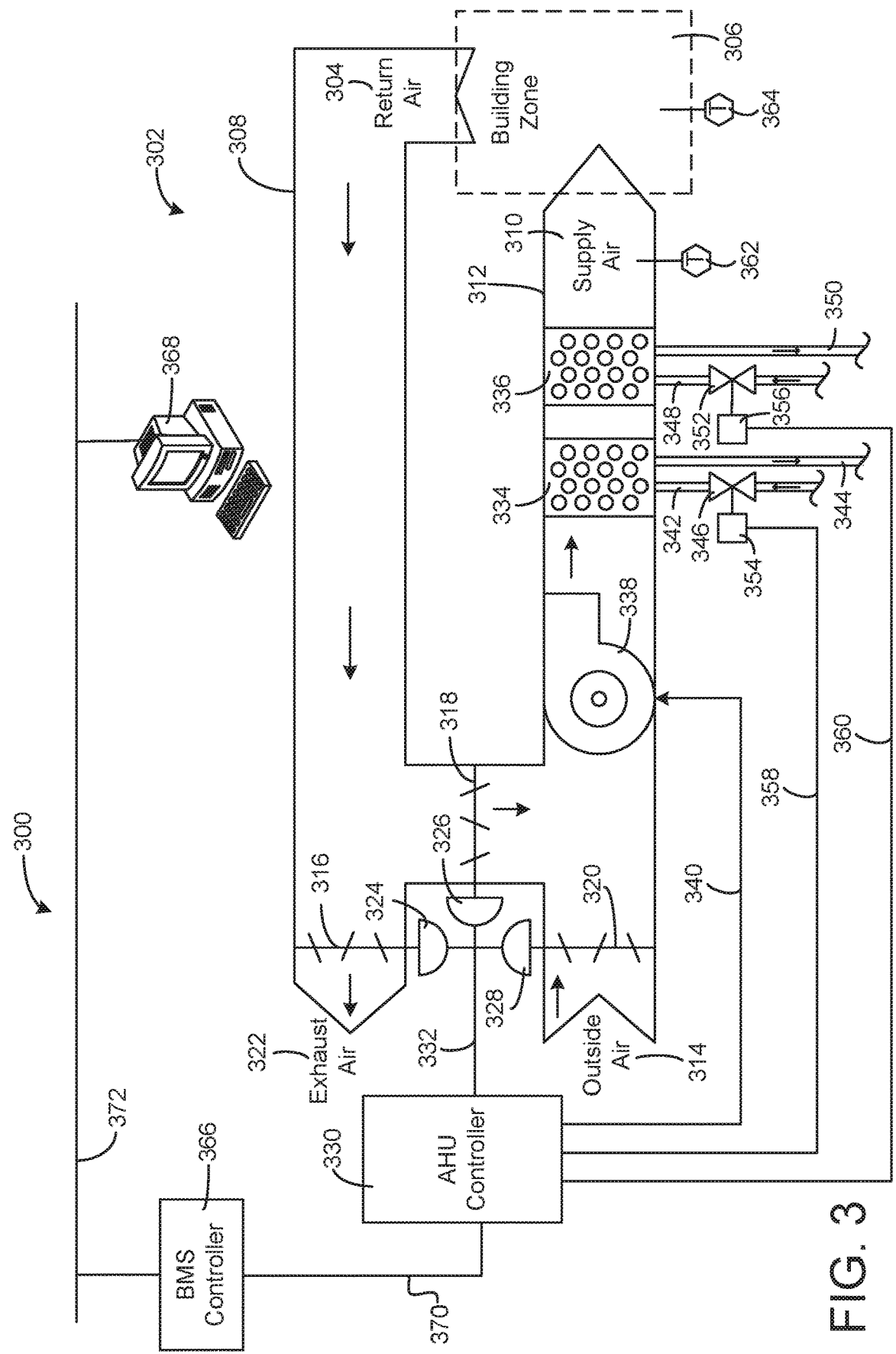
FIG. 3 is a block diagram of an airside system which can be used to serve the building of FIG. 1, according to some embodiments.
Figure 4:
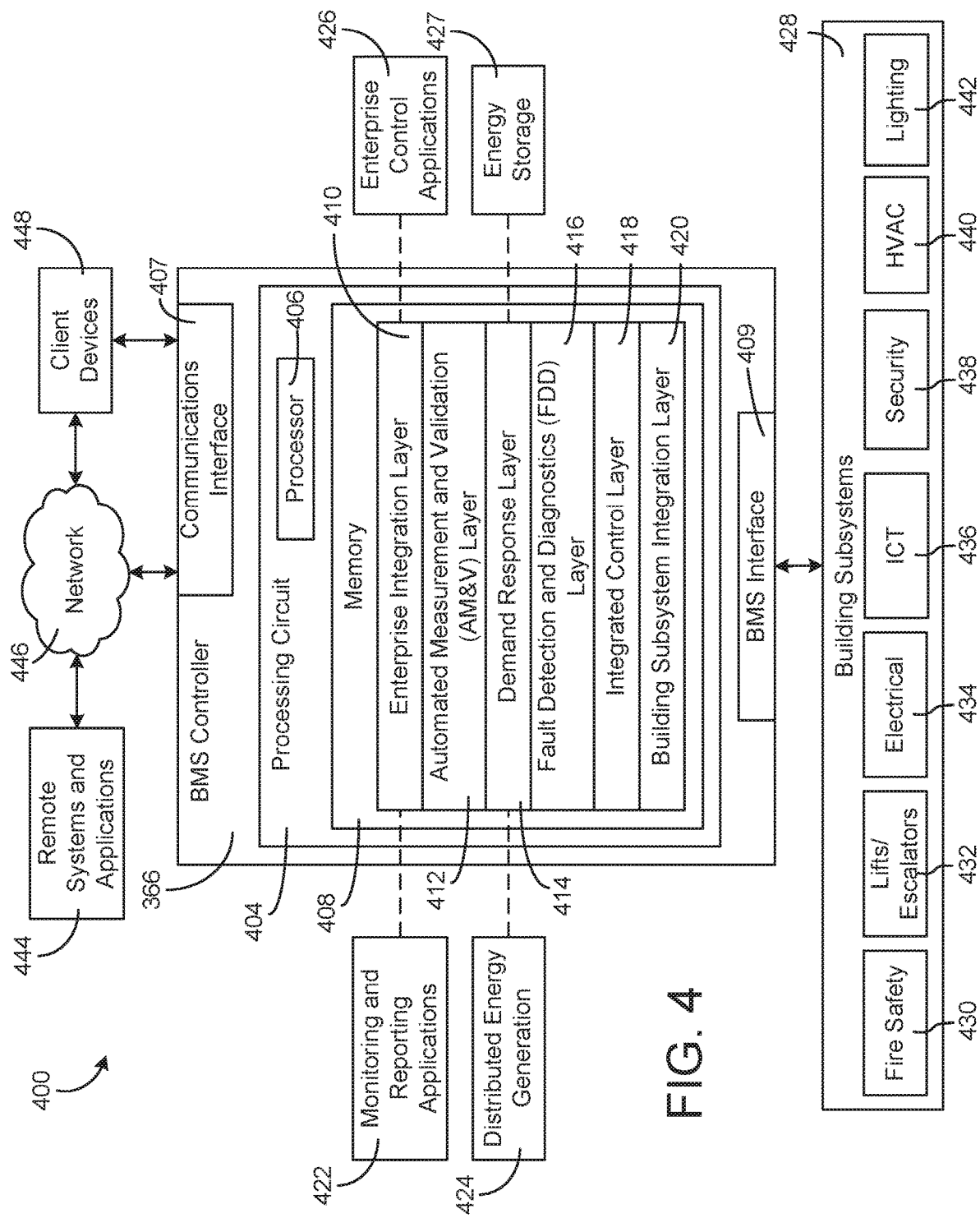
FIG. 4 is a block diagram of a building management system (BMS) which can be used to monitor and control the building of FIG. 1, according to some embodiments.
Figure 5:
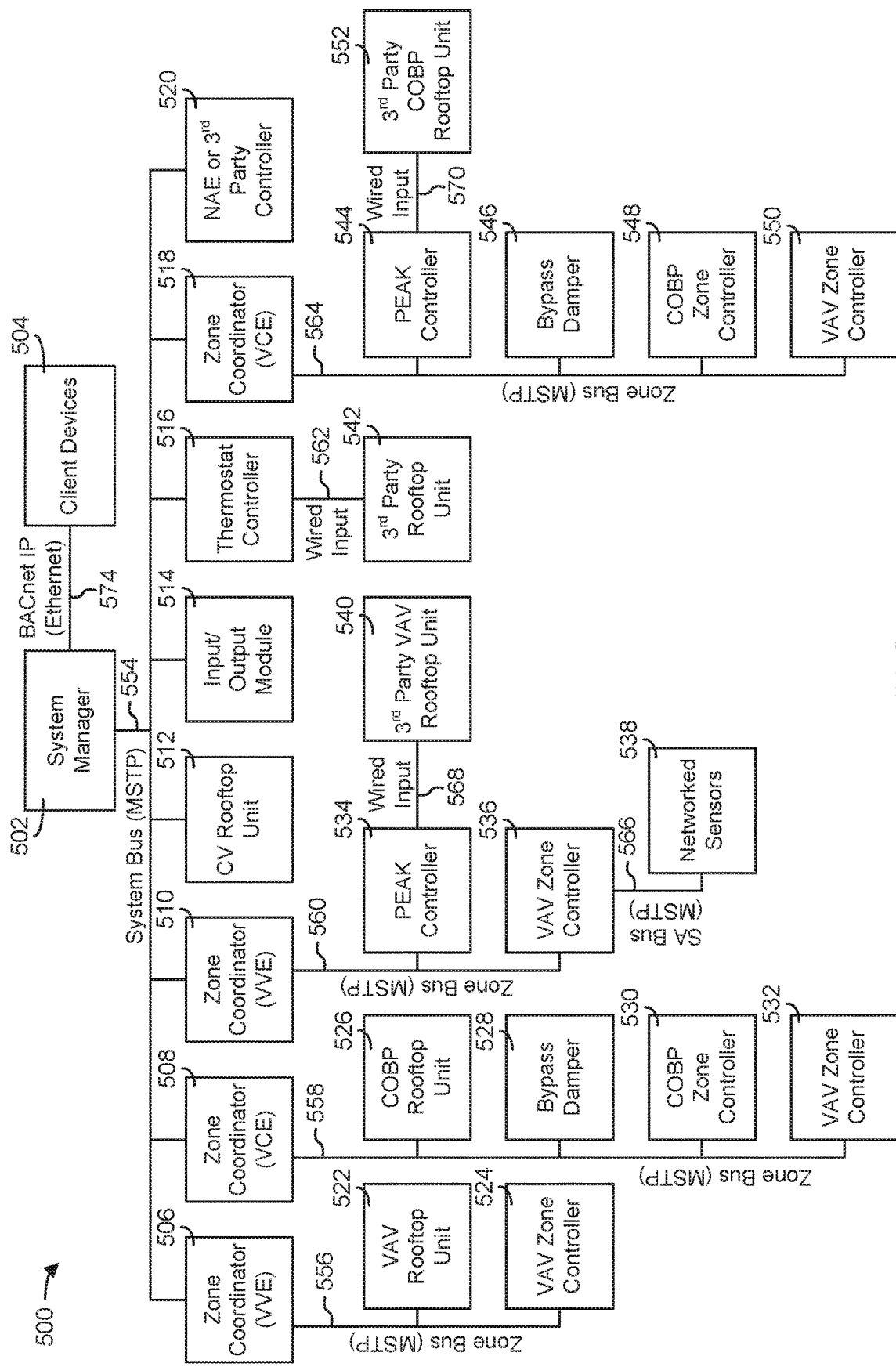
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD)

layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify whether control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/ output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Building Management System with Smart Circuit Breaker

Figure 6A:
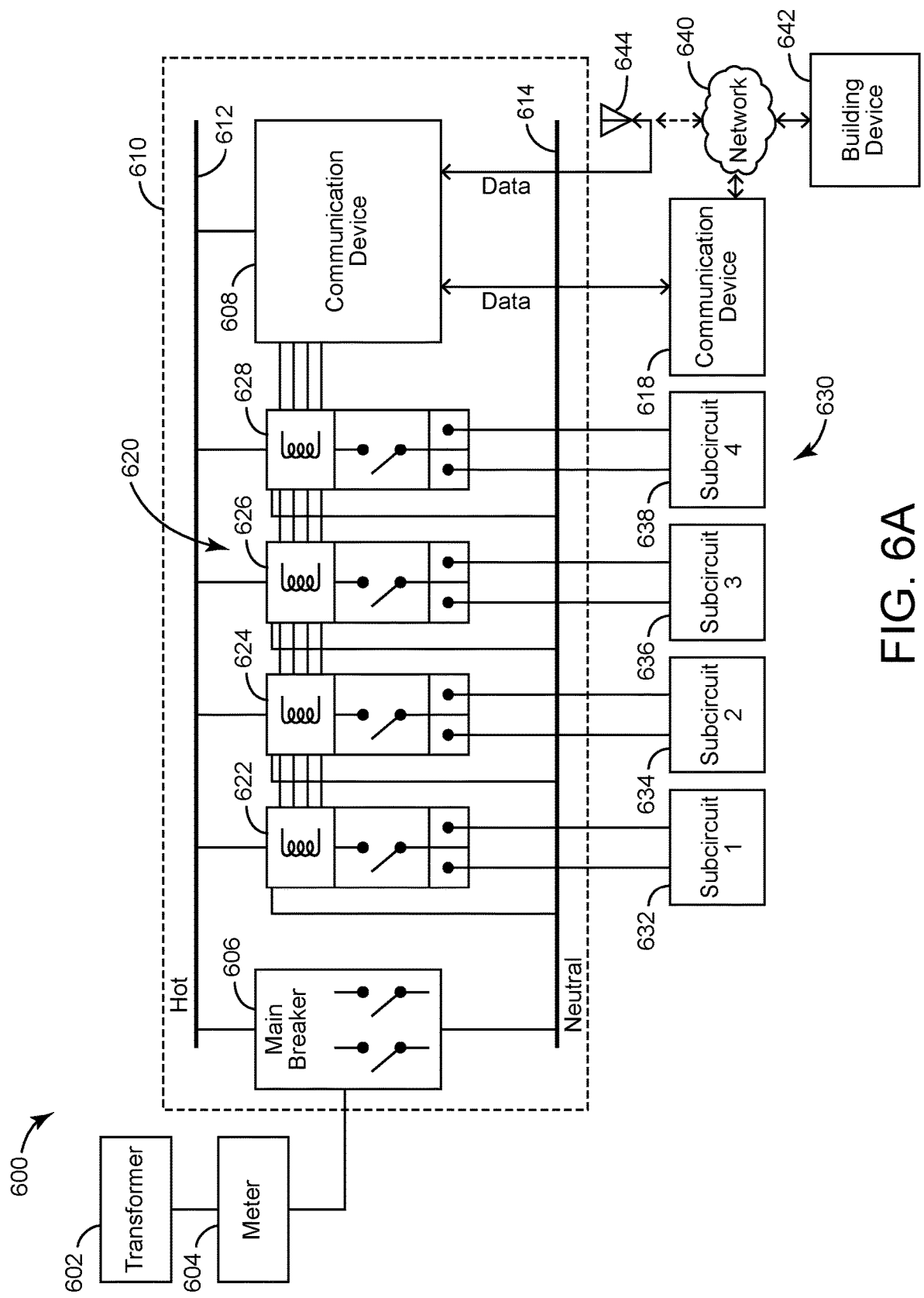
FIG. 6A is a block diagram of a panel assembly configured with a plurality of smart circuit breakers, according to some embodiments.

Referring to FIG. 6A, a block diagram of a system 600 configured with smart circuit breakers is shown schematically, according to some embodiments. The system 600 includes a panel assembly 610 coupled to a plurality of subcircuits 630. Although the system 600 shows the plurality of subcircuits 630 having four individual subcircuits 632, 634, 636, and 638, in other embodiments the plurality of subcircuits 630 may include any number of subcircuits.

The panel assembly 610 is configured to receive a power supply in various embodiments. For example, system 600 is shown to include a transformer 602, which may be configured to receive a power supply from a main service, such as a utility, and provide the received power supply to the panel assembly 610.

Embodiments of the panel assembly 610 may be configured to receive any type of power supply. For example, in some embodiments, the panel assembly 610 is configured to receive a single-phase, one-hundred-and-twenty volt power supply via three conductors: a live conductor, a grounding conductor, and a grounded conductor (neutral). In other embodiments, the panel assembly 610 may be configured to receive a two-phase or three-phase power supply via two or three live conductors, a grounding conductor, and a grounded conductor. In some embodiments, the type of received power supply depends on the rating and configuration of the transformer 602. The meter 604 may be configured to measure a power characteristic, such as voltage and/or current value, of the total power flowing through the transformer 602. The meter 604 may be configured with a current transformer or any suitable device to measure the power characteristic.

The panel assembly 610 is shown to include a main breaker 606, a plurality of smart circuit breakers 620, and a communication device 608. In various embodiments of the system 600, the panel assembly 610 may also include other components generally used within an electric control panel assembly, including but not limited to insulated or non-insulated wire, connectors, terminal strips, a ground fault circuit interrupter, a programmable logic controller, relays, fuses, mechanical on/off/reset switches, and the like.

In some embodiments, the panel assembly 610 may be configured within a control panel enclosure (not shown in the present Figures). The control panel enclosure can be configured to enclose components of the panel assembly 610 and to facilitate electrical connections to and from the enclosed components. The control panel enclosure may be provided with a door configured to provide access to the panel assembly 610 when the door is positioned opened. The control panel enclosure can be configured with one or more overall dimensions to provide suitable spacing between components of the panel assembly 610. The control panel enclosure may also include one or more cut-outs or raceways to facilitate wiring to the panel assembly 610.

The main breaker 606 may be configured to open and/or close one or more sets of contacts. When a set of contacts is closed, electric current is allowed to flow through the main breaker 606 and to the plurality of smart circuit breakers 620; when open, electric current is unable to flow to the plurality of smart circuit breakers 620. In some embodiments, the main breaker 606 is configured to open or close based on selective operation of a switch, such as a mechanical switch that can be controlled by a user (not shown in the present figures). In some embodiments, the main breaker 606 corresponds to an overload protection breaker and/or relay responsive to excessive electric current or heat.

The main breaker 606 can be of any suitable type and rating. In some embodiments, the type and rating of the main breaker 606 is configured based on characteristics of the received power supply (e.g., phase, voltage rating, current rating). In some embodiments, the main breaker 606 is configured with a number of electrical outputs corresponding to a number of conductors provided as an input. For example, when the main breaker 606 receives a single-phase, one-hundred-and-twenty volt power supply, the main breaker can be provided with a live output and a grounded output. In this regard, the main breaker 606 may be configured to connect and disconnect a live conductor 612 and/or a grounded conductor 614.

Each of the plurality of smart circuit breakers 620 may generally be configured to perform a circuit breaker function. For example, each of the smart circuit breakers 620 may be configured with a circuit breaker device. As shown, each of the smart circuit breakers 620 is electrically coupled to the main breaker 606 via the live conductor 612 and the grounded conductor 614. The circuit breaker device may be configured with a set of contacts configured to open and close as described with reference to the main breaker 606. In some embodiments, the circuit breaker device is configured to open and close a live conductor coupled its corresponding subcircuit. In some embodiments, the circuit breaker device is configured to open both a live conductor and a neutral conductor coupled to its corresponding subcircuit.

Each of the smart circuit breakers 620 may also be configured to perform an energy management function in some embodiments. For example, each of the smart circuit breakers 620 may be configured to measure a power characteristic of power supplied to its corresponding subcircuit. The power characteristic may relate to voltage or electric current value, associated with its corresponding electric subcircuit. Each smart circuit breaker can be configured with an energy management module 710 to facilitate the energy management functions. Features of the energy management module 710 are further described herein with reference to FIGS. 7A-7B.

Embodiments of the panel assembly 610 may be configured with any number of smart circuit breakers 620. In some embodiments, the number of the smart circuit breakers 620 corresponds to a number of the subcircuits 630, whereby one smart circuit breaker is provided for each subcircuit. For example, in system 600 four subcircuits 632-638 are electrically coupled to the panel assembly 610, whereby each of the smart circuit breakers 622-628 is provided for each of the four subcircuits 632-638.

As described herein, although the meter 604 only indicates total power flowing to the panel assembly 610 (i.e., to all of the subcircuits 632-638), each of the smart circuit breakers 622-628 may provide power characteristic information for each of the subcircuits 632-638, as described herein. For example, subcircuit 632 may be undesirably consuming the most electric energy relative to the other subcircuits 634-638 for any number of reasons. The meter 604 would be unable to detect which of the subcircuits 632-638 is consuming the most energy. However, smart circuit breakers 622-628 can be configured to detect energy consumption variations among each of the subcircuits 632-638.

In some embodiments, the panel assembly 610 may be configured with a low-voltage power supply unit (not shown in the present Figures) configured to supply low voltage power (e.g., five volts DC) to each of the smart circuit breaker 622-628 and/or to other components of the panel assembly 610. The low-voltage power supply unit can include a transformer with a primary side electrically connected to the main service and a secondary side having a low-voltage output. For example, a processing circuit and/or other internal components of each smart circuit breaker 622-628 may be configured receive electric power by low-voltage power supply unit to facilitate energy management functions. The processing circuit can be electrically coupled to the low-voltage output via an insulated cable, such as a ribbon cable. In this regard, one or more of the smart circuit breakers 622-628 can include an interface or connector configured to receive the low voltage power supply. For example, in some embodiments, each of the smart circuit breakers 622-628 is configured with a cable having a "vampire" clip configured to pierce the insulation of a low voltage power supply cable 616 provided to each of the smart circuit breakers 622-628. In some embodiments, the cable 616 cable 616 (e.g., a ribbon cable) may be configured to "daisy chain" the smart circuit breakers 622-628.

In other embodiments, processing circuit and/or other internal components of each smart circuit breaker 622-628 may be configured receive power from any suitable source. In some embodiments, each smart circuit breaker 622-628 may be configured with one or more components to internally generate low-voltage power. For example, one or more of the smart circuit breakers 622-628 may be configured with an internal step-down transformer having a primary side coupled to the live conductor 612 and neutral conductor 614.

In some embodiments, the communication device 608 may generally be configured to exchange data (e.g., receive power characteristic information) from one or more of the plurality of smart circuit breakers 620. For example, the communication device 608 may be configured to receive power characteristic information from the plurality of smart circuit breakers 620 in the form of digital data, such as Modbus and/or BACnet data. In some embodiments, the communication device 608 may be a router or a hub configured for wired and/or wireless communication. In some embodiments, the communication device 608 is configured to convert Modbus and/or BACnet data to another data communication protocol (e.g., Ethernet) to facilitate communication with external devices and systems.

In some embodiments, the communication device 608 is a controller, such as a BMS controller. In this regard, the communication device 608 can be configured to control one or more of the smart circuit breakers 622-628. For example, the communication device 608 can be configured to send a signal to one or more of the smart circuit breakers 622-628 to open a set of contacts. In some embodiments, the communication device 608 may be configured to send a signal to one or more of the smart circuit breakers 622-628 to close a set of contacts. This may be desirable, for example, when a subcircuit corresponds to an electrical load for lighting.

The communication device 608 may be configured to transmit power characteristic information to one or more external devices and/or systems (e.g. a BMS controller). For example, the system 600 is shown to include a second communication device 618. The second communication device 618 may be a router or hub in some embodiments. In some embodiments, the system 600 includes a network 640 configured to facilitate communication to external devices and systems. The network 640 may be any suitable data network, such as a wireless or wired communication network, a building management system, the Internet, and the like. In some embodiments, the network 640 is configured to facilitate communication to the building device 642. The building device 642 may be a thermostat, a BMS controller, and the like. In some embodiments, the building device 642 is a device configured to perform cloud dashboard analytics and usage. In some embodiments of the system 600, the building device 642 and/or the data transmitter 644 are not provided.

The communication device 608 may be configured with any suitable interface to facilitate communications with the plurality of smart circuit breakers 620 and other systems. In some embodiments, the communication interface is configured for wireless communication, such as Wi-Fi or any other suitable wireless communication protocol. For example, the system 600 is shown to include a data transmitter 644. The data transmitter 644 may be configured to facilitate wireless communication with other devices and/or systems.

In some embodiments, the communication device 608 is configured with a communication interface for wired communication. For example, the communication interface may be configured with a serial communication interface. In some embodiments, the communication interface is configured to provide a data signal over a power supply conductor (e.g., the live conductor 612, the grounded conductor 614, and/or a conductor coupled thereto). For example, the communication interface may be configured with an X10 module or system to provide a data signal over a power supply line to one or more of the subcircuits. It should be understood that embodiments of the communication device 608 may be configured with any suitable wired and/or wireless communication interface.

Figure 6B:
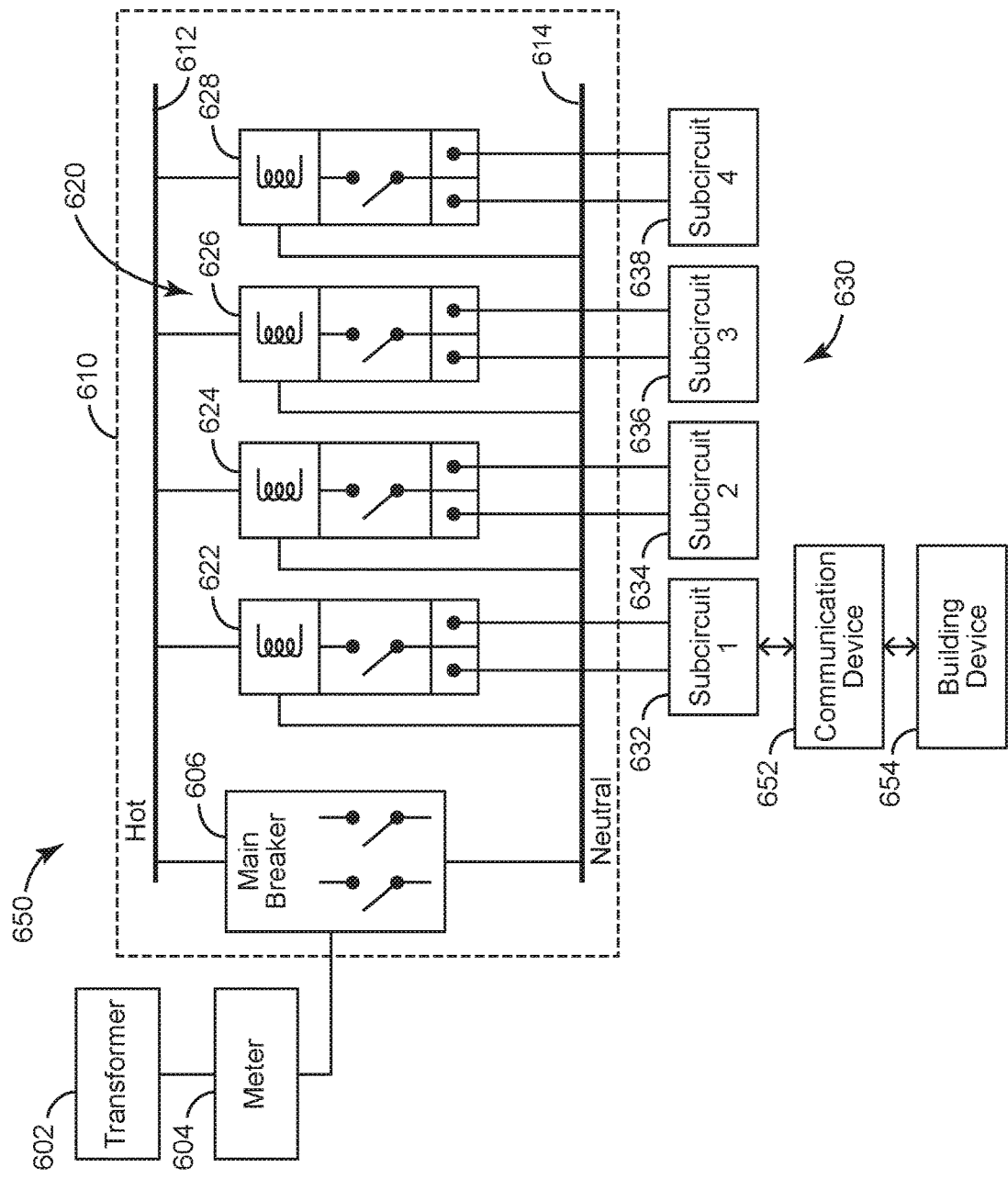
FIG. 6B is another block diagram of a panel assembly configured with a plurality of smart circuit breakers, according to some embodiments.

Referring to FIG. 6B, another block diagram of a system 650 configured with smart circuit breakers is shown schematically, according to some embodiments. In the system 650, at least one of the plurality of smart circuit breakers 620 is configured to provide a data signal over a power line. In this regard, each of the smart circuit breakers 620 may be configured with a communication interface coupled to the power line and configured to transmit a data signal over the power line as described below. In some embodiments, the communication interface is configured to transmit a data signal over the grounded conductor 614. The communication interface is described in further detail with reference to FIG. 7B.

In some embodiments, the communication device 652 is coupled to a power line of the subcircuit 632. The communication device 652 may be configured as described herein with reference to the communication device 608. In some embodiments, the communication device 652 is additionally or alternatively configured with an interface configured for communication over a power line. In this regard, the interface may be configured to receive the data signal from each of the plurality of smart circuit breakers 620 over the power line. The communication device 652 may be configured to translate the received data signal and transmit the received data to one or more external systems or devices. In some embodiments, the communication device 652 may be configured to receive data from an external system or device, and transmit the received data over the power line to one or more of the plurality of smart circuit breakers 620.

The communication device 652 may be configured to transmit received data to the building device 654. The building device 654 may be configured as described with reference to the building device 642. For example, in some embodiments the building device 654 may be a BMS controller. In some embodiments, the building device 654 corresponds to a thermostat, which may be configured with a display device. In this regard, the building device 654 may be configured to display various alerts and information to a user relating to power characteristic information. The building device 654 may be configured with a wired or wireless interface for exchanging data (e.g., power characteristic information) with the communication device 652.

Figure 7A:
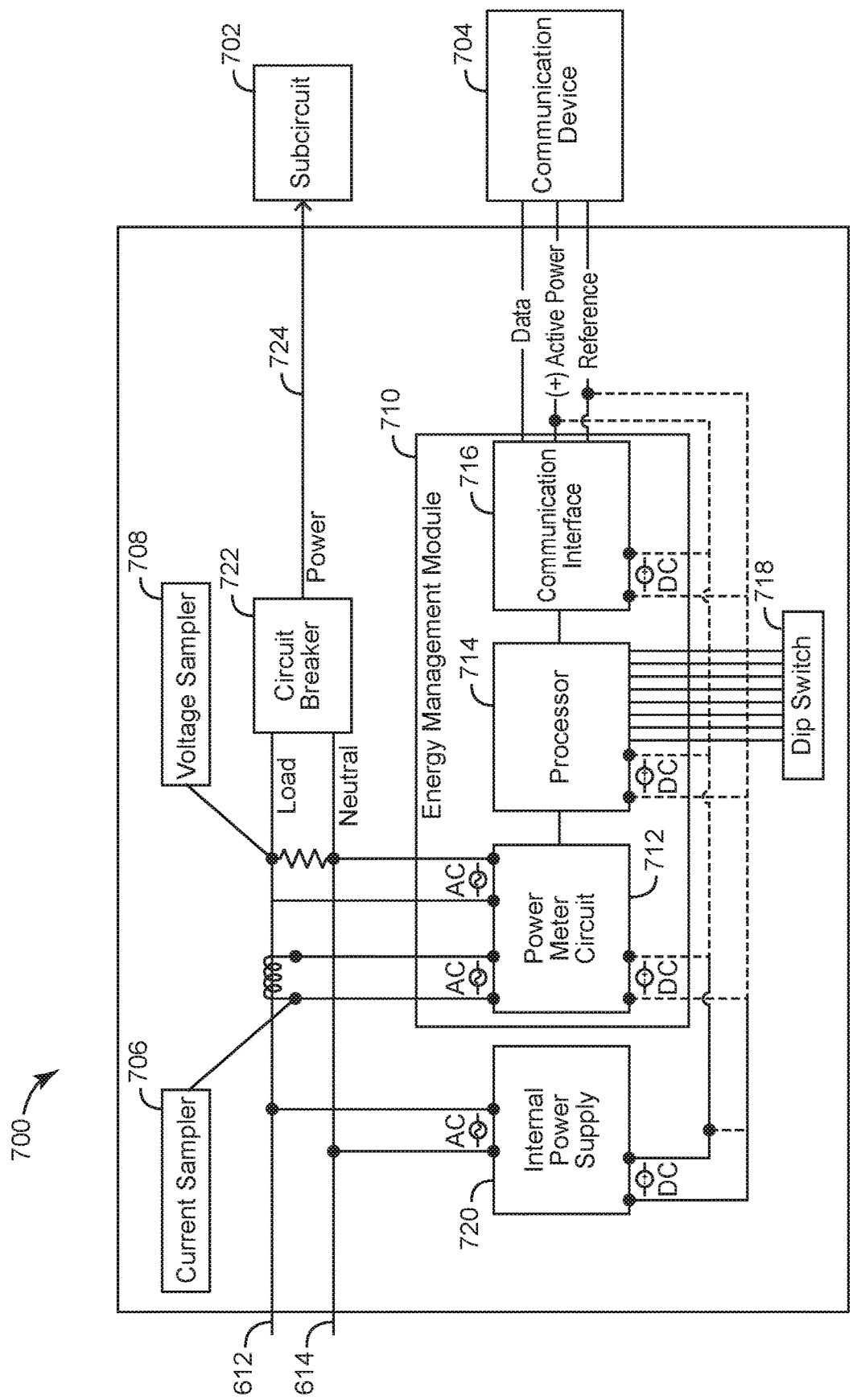
FIG. 7A is a block diagram of a smart circuit breaker of the panel assembly of FIGS. 6A-6B, according to some embodiments.
Figure 7B:
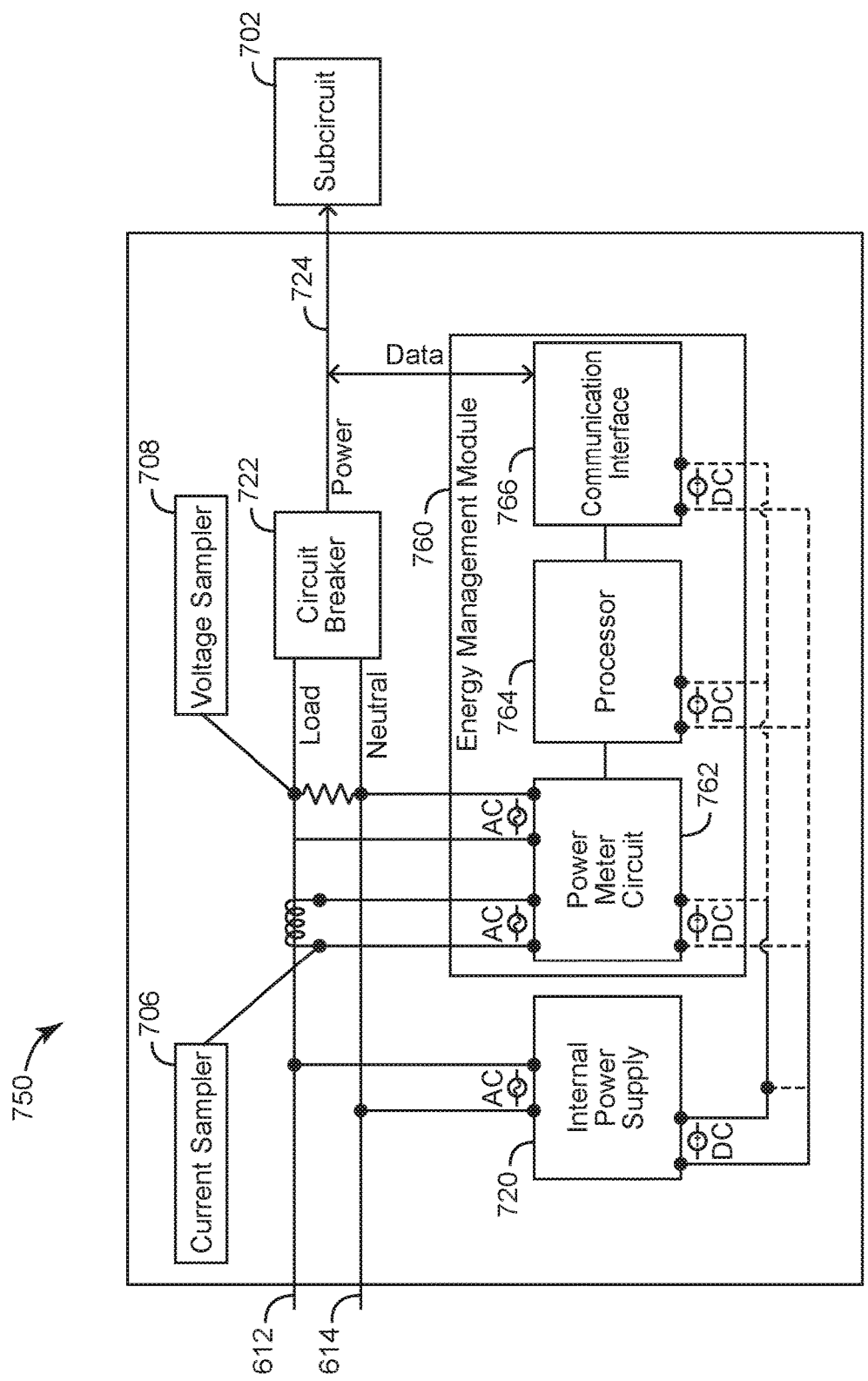
FIG. 7B is another block diagram of a smart circuit breaker of the panel assembly of FIGS. 6A-6B, according to some embodiments.

Referring to FIGS. 7A-7B, a block diagram of a smart circuit breaker 700 and a block diagram of a smart circuit breaker 750, respectively, are shown schematically, according to some embodiments. In some embodiments, the smart circuit breaker 700 of FIG. 7A may be configured with the system 600 shown in FIG. 6A as described herein. In some embodiments, the smart circuit breaker 750 of FIG. 7B may be configured with the system 650 shown in FIG. 6B as described herein.

Referring to FIG. 7A, the smart circuit breaker 700 may be configured as described with reference to the plurality of smart circuit breakers 620 of the panel assembly 610 in some embodiments. The smart circuit breaker 700 may generally be configured to perform a circuit breaker function and an energy management function for the subcircuit 702 as described herein. The subcircuit 702 may correspond to one of the subcircuits 632-638 as described herein.

The smart circuit breaker 700 is shown to include a circuit breaker 722, a voltage sampler 708, a current sampler 706, an energy management module 710, and a dip switch 718. The circuit breaker 722 may be any suitable breaker device. For example, the circuit breaker 722 may be configured to open and close one or more sets of contacts, and may include one or more features of the main breaker 606 as described above with reference to FIG. 6A. For example, the circuit breaker 722 may include a mechanical on/off/reset switch, an overload protection device sensitive to abnormal heat or current levels, and any other suitable components. In some embodiments, the circuit breaker 722 or the smart circuit breaker 700 is configured to include a double pole breaker configured to open both a power supply connection (e.g., live and/or grounded conductors) and a communication connection (e.g. serial data line to a router). In some embodiments, the circuit breaker 722 or the smart circuit breaker 700 includes a solid-state relay configured for lighting control.

The circuit breaker 722 may have an input electrically connected to the live conductor 612 and the grounded conductor 614. The circuit breaker 722 may have an output configured to supply power to the subcircuit 702 via the power line 724. In some embodiments the power line 724 may include a live conductor and a grounded conductor for supplying power to the subcircuit 702.

In some embodiments, the smart circuit breaker 700 is configured to be remotely operated. For example, the circuit breaker 722 may be configured to open and/or close a set of contacts based on an input received from the energy management module 710. In this regard, power to the subcircuit 702 provided by the power line 724 may be remotely interrupted. In some embodiments, the energy management module 710 may be configured to receive an instruction from the communication device 704 to open or close.

The voltage sampler 708 and the current sampler 706 can be of any suitable device configured to measure voltage and electric current, respectively. For example, the current sampler 706 can be a current transformer. Although the smart circuit breaker 700 shows both the voltage sampler 708 and the current sampler 706, in some embodiments one is provided. In some embodiments, the voltage sampler 708 and the current sampler 706 are configured to measure voltage and electric current, respectively, at a predetermined sampling rate, such as 16,000 samples per second. The voltage sampler 708 and/or the current sampler 706 may be communicably coupled to the energy management module 710 (e.g., the power meter circuit 712), to provide measured voltage and electric current data.

The energy management module 710 can generally be configured to facilitate energy management features of the smart circuit breaker 700. For example, the energy management module 710 may be communicably coupled to the current sampler and configured to provide control instructions to the current sampler 708 for measuring electric current flowing to the subcircuit 702. In this regard, the energy management module 710 may be configured to receive measurement values and communicate received measurement values to the communication device 704.

The energy management module 710 may be configured to include a processing circuit, an IC (integrated circuit), a MCU (microcontroller unit), and/or SOC (system on a chip) to facilitate energy management features and communication of measured power characteristic values. For example, the energy management module 710 is shown to include a processor 714. The processor 714 can be implemented as a general purpose processor, an application specific integrated circuit (ASIC), one or more field programmable gate arrays (FPGAs), a group of processing components, or other suitable electronic processing components. In some embodiments, the processor 714 includes or is communicably connected to a memory (not shown). The memory can include one or more devices (e.g., RAM, ROM, Flash memory, hard disk storage, etc.) for storing data and/or computer code for completing or facilitating the various processes, layers and modules described in the present application. The memory can be or include volatile memory or non-volatile memory. The memory can include database components, object code components, script components, or any other type of information structure for supporting the various activities and information structures described in the present application. According to some embodiments, the memory is communicably connected to the processor and includes computer code for executing one or more processes described herein.

The energy management module 710 is shown to include a power meter circuit 712. In some embodiments, the power meter 712 is a SOC chip or circuitry configured to facilitate measurement and/or communication of power characteristics. For example, the power meter 712 may be configured with one or more features for determining RMS calculations for current and/or voltage, line frequency, real power, reactive power, apparent power, power factor, accumulated Watt-hours or kilowatt-Hours, intelligent switch control, digital temperature compensation, phase compensation (±15°); quick calibration routines, etc.

The energy management module 710 be configured with a communication interface 716. In some embodiments, the communication interface 716 includes a RS 485 driver IC configured to provide data to the communication device 704, for example as described above with reference to FIG. 6. For example, the RS 485 driver IC can be configured to receive TTL (transistor-transistor logic) data and provide a RS 485 interface configured to support Modbus and/or BACnet data communication. In some embodiments, the communication interface 716 is configured to transmit a data signal over a power line as described herein.

In some embodiments, the energy management module 710 can be configured to down-sample received measurement data. For example, the current sampler 706 can be configured to measure electric current at a sampling rate of sixteen thousand samples per second, and provide each measurement to the energy management module 710 in the form of digital data. However, it may be impractical or undesirable for the smart circuit breaker 700 to subsequently transmit all received data to the communication device 704. For example, this may be impractical due to bandwidth constraints. In this regard, the energy management module 710 (e.g. the processor 714) can be configured to down-sample received measurement data to a lower rate, such as one sample per second. Referring to the above example, the processor 714 can be configured to calculate an average value of the sixteen thousand samples over the one second time period to generate a downsampled rate of one sample per second.

In some embodiments, the energy management module 710 is communicably connected to a dip switch 718 provided in the smart circuit breaker 700. The dip switch 718 can be used to set an address of the smart circuit breaker 700. For example, the dip switch 718 can be configured with a unique eight-bit address to facilitate Modbus RTU communication. Referring to an example implementation of the panel assembly 610 shown in FIG. 6A, a dip switch 718 can be provided with each of the four smart circuit breakers, whereby each dip switch 718 is configured with a unique eight-bit address.

In some embodiments, the smart circuit breaker 700 is configured with an internal power supply 720. The power supply 720 may be configured to provide power to the energy management module 710 and/or other internal components of the smart circuit breaker 700. In this regard, the power supply 720 may be configured to receive an AC voltage from the conductors 612, 614 and convert the AC voltage to a low-voltage power supply (e.g., five volts DC).

The power supply 720 may be configured with a transformer having a primary side electrically connected to the conductors 612, 614 and a secondary side having a low-voltage output.

Referring to FIG. 7B, another block diagram of a smart circuit breaker 750 is shown schematically according to some embodiments. The smart circuit breaker 750 may be usable with the system 650 in some implementations. The smart circuit breaker 750 may beneficial in implementations where ease of installation is desirable. In current and existing systems configured for energy management of individual circuits, installation may be complex and costly. For example, a team consisting of an electrician and an information technology specialist would configure high-voltage wiring (for supplying power) and low-voltage wiring (for data communication), respectively, when configuring a panel assembly. The installation of high-voltage and low-voltage wiring may be further complicated as code requirements mandate separation of circuits and other safety considerations. Furthermore, measurement devices (e.g. current meters) may not be properly configured, causing inaccurate measurements.

The smart circuit breaker 750 may be a "plug and play device" such that it may replace a traditional circuit breaker in current and existing systems. In this regard, an electrician may simply replace a traditional circuit breaker with the smart circuit breaker 750, allowing data communications for energy management features to be independently addressed by an information technology specialist. In some embodiments, the smart circuit breaker 750 is configured to communicate data over a power line. A communication device (e.g., the communication device 652) may be coupled to a power line of the subcircuit 702, whereby the communication device is configured to exchange data with smart circuit breaker 750 over the power line. An information technology specialist can independently configure the communication device to exchange data (e.g., power characteristic information) with the smart circuit breakers as described herein.

The smart circuit breaker 750 is shown to include an energy management module 760. The energy management module 760 may be configured as described with reference to the energy management module 710. In some embodiments, the energy management module 760 is additionally or alternatively configured to exchange data over the power line 724 using the communication interface 766. In some embodiments, the power meter circuit 762 may be configured as the power meter circuit 712 as described herein, and the processor 764 may be configured as the processor 714 as described herein.

The energy management module 760 includes a communication interface 766. The communication interface 766 may be configured to transmit and/or receive a data signal over the power line 724 as described herein. In some embodiments, the communication interface 766 is coupled to a neutral conductor and/or live conductor of the power line 724. In some embodiments, the energy management module 760 is configured to open or close the circuit breaker 722 as described herein. For example, the processor 764 may be communicably coupled to the circuit breaker 722 and may actuate the circuit breaker 722 based on an instruction or control signal from an external device.

In some embodiments, the smart circuit breaker 750 is configured to communicate data (e.g., power characteristic information) over the power line 724 to the subcircuit 702. In this regard, a communication device (e.g., the communication device 652) may be communicably coupled to the subcircuit 702 as described herein. The communication device may have an interface configured to exchange data with the smart circuit breaker 750 via the power line 724.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A smart circuit breaker configured for installation within a panel assembly, the smart circuit breaker comprising:
a breaker device positioned between a power source and a subcircuit, the breaker device having a moveable contactor configured to change from an open state to a closed state, wherein in the closed state power flows from the power source to the subcircuit via a power line, and wherein in the open state power does not flow from the power source to the subcircuit;
a power meter configured to measure a power characteristic of the subcircuit at a predetermined sampling rate; and
a processing circuit configured to receive a power characteristic measurement from the power meter and downsample the power characteristic measurement to a predetermined downsample rate, the processing circuit having a communications interface configured to communicate power consumption data to an external device, the power consumption data based on the power characteristic measurement.

2. The system of claim 1, wherein the communications interface is configured to communicate the power consumption data to the external device over the power line.

3. The system of claim 2, wherein the communications interface is configured to communicate the power consumption data to the external device over a neutral conductor of the power line.

4. The system of claim 1, wherein the power meter is at least one of a voltage sensing device configured to measure a voltage of the power line or a current sensing device configured to measure electric current of the power line.

5. The system of claim 1, wherein the predetermined sampling rate is a value between 1,000-20,000 samples per second and the predetermined downsample rate is value of less than 2 samples per second.

6. The system of claim 1, wherein the smart circuit breaker further comprises an internal power supply, the internal power supply configured to supply electric power to the processing circuit.

7. A building management system comprising:
a panel assembly configured to receive power from a power source and supply power to a number of subcircuits, the panel assembly comprising a plurality of smart circuit breakers corresponding to the number of subcircuits and a panel enclosure configured to house the plurality of smart circuit breakers, wherein each of the smart circuit breakers comprises:
a breaker device having a moveable contactor configured to change from an open state to a closed state, wherein in the closed state power flows from the power source to one of the subcircuits, and wherein in the open state power does not flow from the power source to the subcircuit,
a power meter configured to measure a power characteristic of the sub circuit at a predetermined sampling rate, and
a processing circuit configured to receive a power characteristic measurement from the power meter and downsample the power characteristic measurement to a predetermined downsample rate, the processing circuit having a communications interface configured to communicate power consumption data, the power consumption data based on the power characteristic measurement; and
a communication device configured to communicate with at least one of the smart circuit breakers.

8. The system of claim 7, wherein the communication device is coupled to a power line of one of the subcircuits, wherein the communications interface is configured to communicate the power consumption data to the communication device over the power line.

9. The system of claim 7, further comprising a building device communicably coupled to the communication device, the building device configured to receive the power consumption data from the communication device.

10. The system of claim 9, wherein the building device is a thermostat having a display device configured to provide a display based on the power consumption data.

11. The system of claim 9, wherein the building device is configured to wirelessly exchange data with the communication device.

12. The system of claim 7, wherein each of the smart circuit breakers further comprises an internal power supply, the internal power supply configured to supply electric power to the processing circuit of the corresponding smart circuit breaker.

13. A panel assembly configured to receive power from a power source and supply power to a number of subcircuits in a building management system, the panel assembly comprising:
a plurality of smart circuit breakers, each of the smart circuit breakers provided for one of the subcircuits, wherein each of the smart circuit breakers comprises:
a breaker device having a moveable contactor configured to change from an open state to a closed state, wherein in the closed state power flows from the power source to one of the subcircuits, and wherein in the open state power does not flow from the power source to the subcircuit,
a power sensor configured to measure a power characteristic of the subcircuit at a predetermined sampling rate, and
a processing circuit configured to receive a power characteristic measurement from the power sensor and downsample the power characteristic measurement to a predetermined downsample rate, the processing circuit having a communications interface configured to communicate power consumption data, the power consumption data based on the power characteristic measurement; and
a panel enclosure, wherein each of the smart circuit breakers is configured within the panel enclosure.

14. The panel assembly of claim 13, further comprising a controller communicably coupled to each of the smart circuit breakers, wherein the controller is configured to receive the power consumption data from each of the smart circuit breakers.

15. The panel assembly of claim 13, wherein each of the smart circuit breakers comprises a dip switch configured set an address of the corresponding smart circuit breaker, wherein the controller is configured to associate power consumption data with one of the smart circuit breakers based on the address of the dip switch.

16. The panel assembly of claim 13, wherein the communications interface is configured to communicate the power consumption data to a communication device over a power line.

17. The panel assembly of claim 13, wherein the communications interface is configured to communicate the power consumption data to the external device over a neutral conductor of the power line.

18. The panel assembly of claim 13, wherein the power sensor is at least one of a voltage sensing device configured to measure a voltage of the power line or a current sensing device configured to measure electric current of the power line.

19. The panel assembly of claim 13, wherein each of the smart circuit breakers further comprises an internal power supply, the internal power supply configured to supply electric power to the processing circuit of the smart circuit breaker.

\* \* \* \* \*